March 24, 1959   W. N. McELROY ET AL   2,879,146
GAS RECOMBINER
Filed March 21, 1956
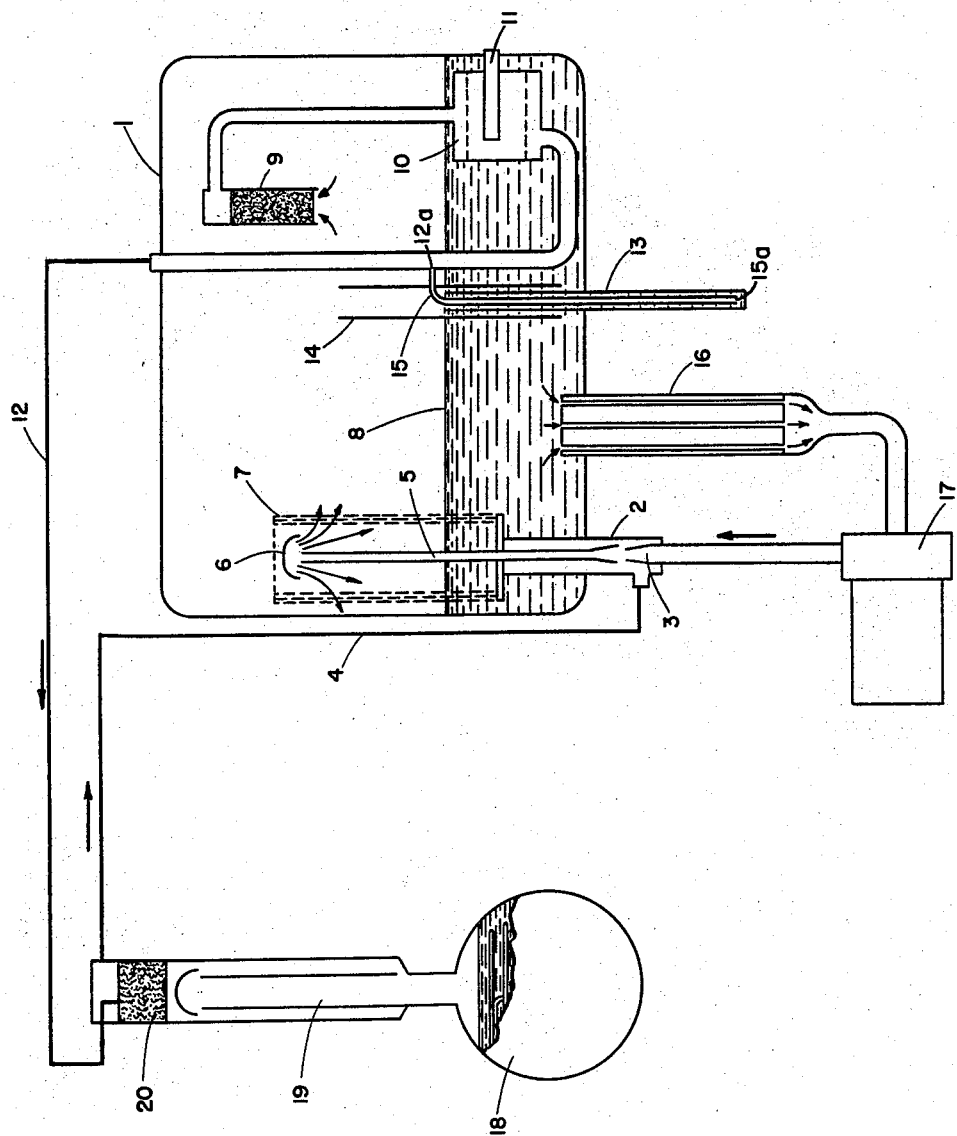
INVENTORS
WILLIAM N. MC ELROY
WILLIAM R. MARTINI
BY
ATTORNEY

2,879,146
GAS RECOMBINER

William N. McElroy, Canoga Park, Calif., and William R. Martini, Ann Arbor, Mich., assignors to North American Aviation, Inc.

Application March 21, 1956, Serial No. 572,841

11 Claims. (Cl. 23—288)

Our invention relates to an improved gas-handling system for a nuclear reactor, and more particularly to an improved recombiner for radiolytic hydrogen and oxygen.

For information concerning the theory, construction and operation of nuclear reactors, reference is made to U.S. Patents 2,708,656 and 2,714,577 to Fermi et al.; Glasstone, "Principles of Nuclear Reactor Engineering" (D. Van Nostrand); "The Reactor Handbook" (3 volumes), published by the U.S. Atomic Energy Commission; and to the "Proceedings of the International Conference on the Peaceful Uses of Atomic Energy," held in Geneva, Switzerland, in August 1955, and available for sale at the United Nations' Book Store, New York, New York. For specific information relating to the aqeous, homogeneous reactors known as "water boiler" types, reference is made to "Research Reactors," Chapter 1, published by the U.S. Atomic Energy Commission.

In the operation of the water boiler reactor, water is radiolytically decomposed into hydrogen and oxygen gases. In fact, the name "water boiler" comes from the bubbling of the released gases rather than from boiling of solution water; the reactor actually operates at below the boiling point of water. The recombination of the released hydrogen and oxygen gases is vital to the operation of the reactor. If not recombined, serious results can occur, ranging from core-splitting hydrogen detonations to loss of necessary fluid for maintaining the chain reaction. At the very minimum, if the gases are not recombined, they must be withdrawn from the reactor and replaced with fresh solution.

Hydrogen and oxygen can recombine by a number of different mechanisms. Hydrogen in oxygen at low concentrations can react catalytically without a flame. As soon as the hydrogen concentration reaches the flammable limit (approximately 4.65 volume percent at one atmosphere pressure and 291° K.), the heat given off in the reaction increases the temperature of the gas to the ignition temperature, producing a flame. At higher hydrogen concentrations (above 4.65 volume percent), the reaction rate and flame propagation velocity increase to such an extent that mild or normal explosions result. When the concentration is further increased and the detonation limit (approximately 15 volume percent) is reached, the reaction takes place at such a high rate that severe supersonic shock waves are generated.

Two general types of recombining systems are known, namely, flame and catalytic. The flame-type recombiner works under the principle of burning the hydrogen to supply the needed energy for the recombination reaction, while catalytic recombining takes advantage, at a lower temperature, of certain catalysts such as copper and platinum. Catalytic recombiners have been of a "dry" type, that is, all components of such systems, except the condensor and gas return line to the core, are essentially dry; the circulating gases are not saturated with water. With two exceptions, current dry recombiners are used in open rather than closed systems—fission product gases are vented to a stack after a suitable holdup. While this is permissible in thinly populated areas, it is hazardous for reactors in areas of dense population.

A number of drawbacks have been experienced with the dry gas recombiners. If the catalyst is dry during a power surge, more hydrogen will be present, and the catalyst itself, which usually operates at a temperature of 300–400° C., will heat up to around 500° C. and serve to ignite the hydrogen. A detonation reaction could flashback into the reactor with possible damage to core components, extending even to core rupture, since the supersonic waves accompanying the explosion may increase the pressure sevenfold or more. This is about the most serious sort of accident that can occur with reactors of this type; nuclear incidents are ruled out by the inherently self-controllable feature of such reactors due to their large negative temperature and power coefficients of reactivity. Furthermore, even when operating reasonably well, some loss of fissionable material to the gas-handling system inevitably occurs, since entrainment eliminators are not 100% efficient. Finally, such dry systems do not have provision for handling severe transients.

In view of the shortcomings of the prior art, an object of our invention is to provide an improved, closed-type, gas handling system for an aqueous homogeneous reactor.

Another object is to provide an improved catalytic recombiner for radiolytically decomposed water.

Another object is to provide such a system wherein detonations are largely eliminated and easily buffered.

Still another object is to provide such a system wherein the loss of uranium because of entrainment is greatly reduced.

Yet another object is to provide such a system which can easily contain rapid overflow of core solution due to transients without loss of core solution.

A further object is to provide such a system which will serve as an auxiliary reactor control.

Still other objectives and advantages of our invention will become apparent from the following detailed description, the accompanying drawing and the attached claims. The single accompanying drawing is a schematic representation of an embodiment of our invention.

In accordance with our present invention, we have provided an improved catalytic recombiner for hydrogen and oxygen gases, which comprises a tank, a gas pump for circulating said gases, a carrier gas and water vapor together with water through said tank, means in said tank for separating said gases and particulate water, a catalytic recombiner within said tank, a gas return line from said tank, means for controlling the water level within said tank, heat removal means, and a water recirculating pump.

Our invention is proving to be so successful that it is being incorporated into the new water boiler reactors. In our novel wet-type gas-handling system, nearly all components, except the catalyst chamber, are continuously washed down with water. (The catalytic reaction proceeds faster with a dry catalyst.) Any entrained core solution and certain fission products are returned to the reactor core. In contrast, any entrained core solution carried over into the dry-type system remains permanently in the gas-handling system. Thus, we have shown that at a power level as high as 50 kw., only 0.06 g./u. should be retained in the recombiner system. Explosions are in part prevented by excess neutral carrier gas (generally oxygen) initially provided as the reactor atmosphere; this keeps the hydrogen concentration below the explosive point through dilution, and when oxygen is the carrier gas provides a stoichiometric excess for the recombination reaction. Further dilution is provided by the water vapor in our wet-type system, the water vapor also serving to buffer any explosions. The severity of any explosion is still further diminished by a lower hydrogen gradient in regions away from the catalyst, and by the ballast space above the water level in the recombiner chamber for three dimensional expansion of any shock waves. This system can easily handle sudden core solution overflows due to nuclear transients, and solution level control provides auxiliary control over the reactor. Also, the recombiner tank is an excellent gamma source for experimental purposes.

Referring now to the drawing, our wet-type gas-handling system is shown diagrammatically, together with a solution-type reactor. The recombiner tank 1 houses many of the components of the system and serves as a water reservoir or sump, as a catalyst cooler and as a ballast chamber to lessen the effect of pressure fluctuations within the reactor atmosphere under steady state and transient conditions. Gas-pump or aspirator 2 is a jet-type, wherein the pressure difference which drives the gas through the recirculating system is produced by circulating water through an ejector-type nozzle 3. This ejector also acts as a condenser for recombined and vaporized water. Gas inlet line 4 enters near the nozzle and the hydrogen-oxygen-water vapor mixture is carried by the water stream into tank 1, through pipe 5, where it is deflected by baffle 6. Calming screen 7, consisting of multiple layers of fine mesh screening, dampens the turbulent flow of water from the ejector after it is deflected by the baffle. This separates the mixture into a gas phase and a liquid phase which contributes to water level 8 in tank 1. Entrainment eliminator 9, of stainless steel wire, effectively prevents any particulate water in the gas phase from entering catalyst chamber 10, thus serving as a second gas-liquid separator. The catalyst consists of pellets of aluminia covered with platinum. The catalyst chamber 10 is provided with heater 11, which maintains the temperature of the aluminum oxide particles high enough to prevent condensation of moisture. The catalyst chamber is positioned below the water level. Gas return line 12 returns condensed water to the reactor. The water level in tank 1 is kept constant by means of an overflow weir 13. Baffle tube 14 prevents any spurious waves from passing over the top of weir 13. The discharge tube 15 of weir 13 is connected to the gas return line 12. Heat exchanger 16 is provided to dissipate the heat of the recombination reaction and the water pump, and maintain the temperature of the sump water at the desired level. Water circulating pump 17 circulates sump water through the heat exchanger to the water aspirator 2, at a fixed rate, thereby leaving to the overflow weir the handling of excess core solution.

The operation of the gas-handling system is indicated by the following description of gas flow. A neutral gas atmosphere (such as a rare gas, air or oxygen) is initially provided above the core solution level of reactor 18. The gas serves as a hydrogen diluent together with water vapor and as a carrier gas. As the reactor is operated, radiolytic hydrogen and oxygen and water vapor pass through regurgitator assembly 19 and entrainment eliminator 20 into gas inlet line 4 at the top of the core tank where they are mixed with the carrier gas. This mixture is introduced into the recombiner chamber, together with water, by means of water ejector gas pump 2. This water aspirator condenses recombined and vaporized water; and nearly all components, except the catalyst chamber, are continuously washed down with water. The deflector baffle 6 and disengaging screen 7 separate the gas-water mixture. Moist gas then enters the second separating device, entrainment eliminator 9, which effectively prevents particulate water from entering the catalyst chamber. The catalyst is 0.3% by weight platinum, deposited on ⅛" x ⅛" pellets of alumina. The reconstituted water vapor is swept through gas return line 12 to jet pump 2. Some vaporization of water takes place at the overflow weir and in the return line 12 because of cooling of the hot catalytic gases.

Gases and uncondensed water vapor will not pass through entrainment eliminator 20 into the reactor (only particulate water is returned), but will be recirculated to the jet pump where the water vapor is condensed in the recirculating water. The weir 13 operates in a conventional manner to insure that the liquid level in the recombiner tank does not rise above a predetermined level. Since the pressure in the discharge tube 15 of the weir is lower than the pressure in the recombiner tank, due to frictional gas flow loss, the solution in the weir tube 13 is maintained a certain number of inches below the outlet of the discharge tube 15; therefore, any overflow water dropping into tube 13 up through baffle 14 will enter tube 15 at opening 15a and will tend to increase the water level in tube 15. This extra water will be forced into the return line 12. Thus, any core solution is swept back to the core tank by the rapidly flowing recirculating gases in return line 12. During this cycle, water pump 17 (preferably a canned rotor pump to prevent leakage of radioactive solution), withdraws solution from the recombiner tank through the heat exchanger 16 at a rate equal to the input rate into the tank, in order to dissipate the heat of reaction and maintain the temperature of the water below that of the reactor core solution. Any excess water can thus be considered to come from the core and is handled by the weir.

As an example of operation of our recombiner, the following complete engineering analysis is offered, following the normal gas flow. The water boiler reactor operated at a power level of 50 kw. and at a temperature of 80° C. The recombiner is of stainless steel.

Gas from reactor:
  $H_2$ _____ g. moles/hr__ 25.5
  $O_2$ _____ g. moles/hr__ 12.75
  $H_2O$ (vap.) _____ g. moles/hr__ 37.2
  Temp. _____ ° C__ 80

Gas mixture (from reactor and to gas recombiner assembly):
  $H_2$ _____ g. moles/hr__ 33.7
  $O_2$ _____ g. moles/hr__ 537.8
  $H_2O$ (vap.) _____ g. moles/hr__ 122.7
  Temp. _____ ° C__ 80
  Gas velocity _____ ft./sec__ 38.5

Water ejector:
  $H_2O$ (liq.—from recirculating pump)_gal./min__ 25
  Temp. of liq. $H_2O$ _____ ° C__ 34
  Pressure—
    (a) Gas mixture _____ —19.7 in. $H_2O$*
    (b) $H_2O$ (liq.) _____ p.s.i.g__ 43

Entrainment eliminator:
  $H_2$ _____ g. moles/hr__ 33.7
  $O_2$ _____ g. moles/hr__ 537.8
  $H_2O$ (vap.) _____ g. moles/hr__ 31.7
  Temp. _____ ° C__ 34
  Pressure—
    (a) Inlet _____ 0 in. $H_2O$
    (b) Outlet _____ —1.2 in. $H_2O$
  Gas velocity _____ ft./sec__ 8.9

Catalyst chamber:
  Temperature—
    (a) Inlet _____ ° C__ 34
    (b) Outlet _____ ° C__ 445
  Pressure—
    (a) Inlet _____ —3.0 in. $H_2O$
    (b) Outlet _____ —6.9 in. $H_2O$
  Gas velocity _____ ft./sec__ 5.1

* Ref. 14.7 p.s.i.a.

Gas return line (before weir and under water):
  $H_2$ _____g. moles/hr__ 8.22
  $O_2$ _____g. moles/hr__ 525
  $H_2O$ (vap.) _____g. moles/hr__ 57.2
  Temp. _____° C__ 445
  Gas velocity _____ft./sec__ 118
Weir return line:
  $H_2O$ (liq.) _____g. moles/hr__ 91.0
  Temp. _____° C__ 34
  Pressure _____ —12.2 in. $H_2O$
Gas return line (after weir):
  $H_2$ _____g. moles/hr__ 8.22
  $O_2$ _____g. moles/hr__ 525
  $H_2O$ (vap.) _____g. moles/hr__ 85.5
  $H_2O$ (liq.) _____g. moles/hr__ 62.7
  Temp. _____° C__ 100
  Pressure at core _____ —18.1 in $H_2O$
  Gas velocity _____ft./sec__ 76.8
Water returned to reactor: $H_2O$ (liq.)_g. moles/hr__ 62.7
Heat Exchanger:
  Cooling water _____gal./min__ 1.7
  Temperature—
    (a) Inlet _____° C__ 17.8
    (b) Outlet _____° C__ 25.1

It should be understood that the foregoing is merely illustrative and not restrictive. Changes may be made in individual components without departing from the spirit of our invention. For example, by simply increasing the pressure within the closed system the reactor power can be increased. Therefore, our invention should be limited only as is indicated by the appended claims.

Having thus described our invention, we claim:

1. An improved catalytic recombiner system for radiolytic hydrogen and oxygen from a solution-type reactor, which comprises a gas outlet line from said reactor for a gaseous mixture from said reactor comprising said radiolytic gases, oxygen carrier gas, and water vapor, a recombiner tank partially filled with water, a gas aspirator connected with said tank, said outlet line communicating with said tank through said gas aspirator, said aspirator introducing into said tank said gaseous mixture from said reactor together with water drawn from said tank; said tank containing: a gas-liquid separator positioned at the entrance of said gas-water mixture into said tank, a catalytic recombiner chamber, a heater positioned in said catalytic chamber, a second gas-liquid separator connected with and arranged to discharge into said catalytic chamber, said gas-liquid separators being positioned above the level of water in said tank, and said catalytic chamber being immersed in said water, a gas return line connecting said catalytic chamber with said reactor for return of reconstituted water to said reactor, said gas inlet and outlet lines communicating in said reactor, a weir positioned adjacent said gas return line in said water adapted to receive overflow water, and a discharge tube positioned within the area defined by said weir, said discharge tube connecting with said gas return line for return of water to said reactor, thereby maintaining the level of water within said tank at a predetermined level; a heat exchanger connected to said tank, and a water pump connected with said heat exchanger and said gas pump for circulating water from said tank through said heat exchanger to said aspirator.

2. An improved catalytic recombiner system for radiolytic hydrogen and oxygen from a solution-type reactor, which comprises a gas outlet line from said reactor for a gaseous mixture comprising said gases, a carrier gas and water vapor, a recombiner tank partially filled with water, a gas aspirator connecting said outlet line with said recombiner tank, said gas aspirator introducing said gaseous mixture together with water drawn from said tank into said tank; said tank containing: a catalytic chamber immersed in said water, gas-water separator means adapted to discharge into said catalytic chamber positioned above the level of water in said tank, a gas return line connecting said recombiner chamber and said reactor, said gas inlet and outlet lines communicating in said reactor, a weir positioned in said water adapted to receive overflow water, and a discharge tube positioned within the area defined by said weir and communicating with said gas return line for return of water to said reactor; a heat exchanger connected with said tank, and a water pump connected with said heat exchanger and said gas aspirator for circulating water from said tank through said heat exchanger to said gas aspirator.

3. An improved catalytic recombiner for radiolytic hydrogen and oxygen from a solution-type reactor, which comprises a gas outlet line from said reactor for said gases, a recombiner tank partially filled with water, a gas aspirator connecting said outlet line with said recombiner tank, said gas aspirator introducing into said tank said gases together with water drawn from said tank; said tank containing: a catalytic chamber immersed in said water, gas-water separator means adapted to discharge into said catalytic chamber, a gas return line from said chamber to said reactor for return of reconstituted water, and means for controlling the water level within said tank at a predetermined level including a weir, said water level control means communicating with said return line for return of overflow water to said reactor; a heat exchanger connected with said tank, and a water pump for circulating water from said tank through said heat exchanger to said gas aspirator.

4. An improved catalytic recombiner system for radiolytic hydrogen and oxygen from a solution-type reactor, which comprises a gas outlet line from said reactor for said gases, a recombiner tank partially filled with water, a gas aspirator, said gas aspirator being connected with said outlet line and said recombiner tank for introducing said gases together with water drawn from said tank into said tank; said tank containing: a catalytic chamber cooled by said water, gas-water separator means adapted to discharge into said catalytic chamber, a gas return line connecting said catalytic chamber with said reactor for return of reconstituted water to said reactor, and means for controlling the water level within said tank at a predetermined level, said water level control means communicating with said gas return line for return of excess water to said reactor; a heat exchanger connected with said tank, and a water circulating pump for circulating water from said recombiner tank through said heat exchanger to said gas aspirator.

5. An improved catalytic recombiner system for radiolytic hydrogen and oxygen from a solution-type reactor, which comprises a gas outlet line from said reactor for said radiolytic gases, a recombiner tank, a gas aspirator connected with said tank, said outlet line being connected with said tank through said gas aspirator; said tank containing: a catalytic chamber cooled by said water, gas-water separator means adapted to discharge into said catalytic chamber, a gas return line connecting said catalytic chamber and said reactor for return of reconstituted water, and means for controlling the water level within said tank, whereby excess water is returned to said reactor; a heat exchanger connected with said tank, and a water pump communicating with said heat exchanger and said gas aspirator for circulating water from said tank through said heat exchanger to said gas aspirator.

6. An improved catalytic recombiner system for radiolytic hydrogen and oxygen from a solution-type reactor, which comprises a gas outlet line from said reactor for said radiolytic gases, a recombiner tank partially filled with water, a gas pump connected with said tank, said outlet line communicating with said tank through said gas pump; said tank containing: a catalytic chamber cooled by said water, gas-water separator means adapted to discharge into said catalytic chamber, a gas return line connecting said catalytic chamber and said reactor for the return of reconstituted water to said reactor, means communicating with said gas return line for returning overflow water into said gas return line, thereby controlling the water level within said tank at a predetermined level, and means for controlling the temperature of the water within said tank; and water transfer means communicating with said tank and said gas pump for circulating water from said tank to said gas pump.

7. The recombiner of claim 6 wherein said water level control means includes a weir.

8. The recombiner system of claim 6 wherein said water level control means comprises a weir adjacent said gas return line, and a discharge tube positioned within the area defined by said weir, said discharge tube communicating with said gas return line for return of overflow water to said reactor.

9. The recombiner of claim 6 wherein said gas-water separator means are positioned above the level of water within said tank, and said catalytic chamber is immersed in said water.

10. The recombiner of claim 6 wherein said temperature control means is a heat exchanger connected with said tank, and said water transfer means circulates water from said tank through said heat exchanger to said gas aspirator.

11. An improved catalytic recombiner for hydrogen and oxygen gases, which comprises a tank partially filled with water, a gas pump connected with said tank, said pump introducing said gases together with water into said tank; said tank containing: a catalytic chamber cooled by said water, gas-water separator means adapted to discharge into said catalytic chamber, a gas outlet line connected with and exiting said catalytic chamber for withdrawal of reconstituted water from said tank, and water level control means communicating with said gas return line; means for controlling the temperature within said tank; and a water pump for circulating water from said tank to said gas pump.

References Cited in the file of this patent

Proceedings of the International Conference on the Peaceful Uses of Atomic Energy, held in Geneva August 8–20, 1955; vol. 2, United Nations, N. Y. (1956), pp. 385, 386, 387.

Nucleonics II (9) pp. 25–29 (1953).

Chemical Eng. Catalog (1942–43). The Process Industries Catalog, 27th Annual Edition, pub. by Reinhold Pub Co., N.Y., p. 955.

ORNL–1583, U.S. Atomic Energy Comm. Technical Information Services, Oak Ridge, Tenn. Date issued October 22, 1953, pp. 8–11.